(12) United States Patent
Wang et al.

(10) Patent No.: US 12,185,248 B2
(45) Date of Patent: *Dec. 31, 2024

(54) METHODS FOR EFFICIENT POWER SAVING FOR WAKE UP RADIOS

(71) Applicant: InterDigital Patent Holdings, Inc., Wilmington, DE (US)

(72) Inventors: Xiaofei Wang, Cedar Grove, NJ (US); Li-Hsiang Sun, San Diego, CA (US); Oghenekome Oteri, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/385,631

(22) Filed: Jul. 26, 2021

(65) Prior Publication Data
US 2021/0360531 A1    Nov. 18, 2021

Related U.S. Application Data

(63) Continuation of application No. 16/347,192, filed as application No. PCT/US2017/059893 on Nov. 3, 2017, now Pat. No. 11,076,353.
(Continued)

(51) Int. Cl.
*G08C 17/00* (2006.01)
*H04W 52/02* (2009.01)

(52) U.S. Cl.
CPC .............................. *H04W 52/0235* (2013.01)

(58) Field of Classification Search
CPC .......... H04W 52/0235; H04W 52/0229; H04L 63/08; H04L 63/083; H04L 63/0861;
(Continued)

(56) References Cited

U.S. PATENT DOCUMENTS 4,769,812 A * 9/1988 Shimizu .................. H04L 12/52
370/383
5,617,419 A * 4/1997 Christensen ....... H04Q 11/0478
370/506
(Continued)

FOREIGN PATENT DOCUMENTS

CN    102056158 A    5/2011
CN    102957540 A    3/2013
(Continued)

OTHER PUBLICATIONS

Osama Aboul-Magd et al., 802.11 HEW SG Proposed PAR, Huawei Technologies; IEEE P802.11 Wireless LANs; Doc. IEEE 802.11-14/0165r0 (available at https://mentor.ieee.org/802.11/dcn/14/11-14-0165-01-0hew-802-11-hew-sg-proposed-par.docx), Mar. 17, 2014, 6 pages.
(Continued)

*Primary Examiner* — Stephen M D Agosta
(74) *Attorney, Agent, or Firm* — Chris Kolefas

(57) ABSTRACT

Exemplary embodiments disclosed herein provide procedures for power efficient and rapid access point (AP) discovery using wake up radios. Additional embodiments provide procedures for securely waking up stations (STAs) using wake up radios (WURs). Methods are further described herein for coverage range detection and STA roaming for wake up radios. Further embodiments relate to procedures for coexistence for wake up radios and primary connectivity radios.

20 Claims, 7 Drawing Sheets

Related U.S. Application Data

(60) Provisional application No. 62/417,134, filed on Nov. 3, 2016.

(58) Field of Classification Search
CPC .............. H04L 9/14; H04M 2203/256; H04M 2203/6009; H04M 2203/6045; G06Q 20/405; G06F 21/31; G06F 21/40; G06F 2221/2111; Y02D 30/70
See application file for complete search history.

(56) References Cited

U.S. PATENT DOCUMENTS

| | | | |
|---|---|---|---|
| 5,898,679 A | 4/1999 | Brederveld et al. | |
| 6,463,307 B1* | 10/2002 | Larsson | H04W 52/0216 455/67.14 |
| 6,718,381 B1* | 4/2004 | Herzi | G06F 21/88 709/224 |
| 7,079,656 B1* | 7/2006 | Menzel | H04W 12/033 380/283 |
| 7,373,508 B1* | 5/2008 | Meier | H04W 12/065 713/168 |
| 8,631,254 B2* | 1/2014 | Kwak | H04B 13/005 713/300 |
| 9,736,779 B2* | 8/2017 | Min | H04W 52/0235 |
| 10,080,125 B2* | 9/2018 | Shellhammer | H04W 52/0216 |
| 10,383,058 B2 | 8/2019 | Lepp et al. | |
| 10,687,282 B2* | 6/2020 | Huang | H04W 52/0248 |
| 10,779,236 B2 | 9/2020 | Azizi et al. | |
| 10,880,835 B2 | 12/2020 | Wang et al. | |
| 10,904,834 B1* | 1/2021 | Noh | H04W 52/0229 |
| 10,912,024 B2 | 2/2021 | Huang et al. | |
| 10,924,995 B2 | 2/2021 | Patwardhan et al. | |
| 10,925,000 B2 | 2/2021 | Yun et al. | |
| 11,249,782 B2* | 2/2022 | Tsirkin | G06F 9/45558 |
| 2001/0044906 A1* | 11/2001 | Kanevsky | G07F 7/122 726/19 |
| 2002/0069359 A1* | 6/2002 | Watanabe | G11B 20/00086 713/176 |
| 2003/0059052 A1* | 3/2003 | Cheng | H04L 9/0891 380/274 |
| 2004/0029582 A1 | 2/2004 | Swab et al. | |
| 2004/0029612 A1 | 2/2004 | Gorsuch | |
| 2004/0122975 A1* | 6/2004 | Lennestal | H04L 63/0428 709/245 |
| 2005/0289139 A1* | 12/2005 | Takashima | G11B 20/00086 707/999.005 |
| 2006/0064588 A1* | 3/2006 | Tidwell | H04L 43/0817 713/169 |
| 2006/0271789 A1 | 11/2006 | Satomura et al. | |
| 2007/0005973 A1 | 1/2007 | Mynam et al. | |
| 2007/0060125 A1 | 3/2007 | Rahim | |
| 2007/0100513 A1* | 5/2007 | Asano | G08G 1/096741 701/2 |
| 2007/0143831 A1* | 6/2007 | Pearson | H04L 63/0838 726/5 |
| 2007/0172063 A1* | 7/2007 | Biggs | H04L 51/04 380/255 |
| 2007/0220253 A1 | 9/2007 | Law | |
| 2007/0242645 A1* | 10/2007 | Stephenson | H04W 52/0216 370/318 |
| 2008/0133909 A1* | 6/2008 | You | H04L 63/08 713/161 |
| 2008/0188266 A1 | 8/2008 | Carter et al. | |
| 2009/0010191 A1 | 1/2009 | Wentink | |
| 2009/0172443 A1* | 7/2009 | Rothman | G06F 1/3209 713/323 |
| 2009/0205036 A1 | 8/2009 | Slaton et al. | |
| 2010/0080134 A1 | 4/2010 | Maniatopoulos et al. | |
| 2010/0284316 A1 | 11/2010 | Sampathkumar | |
| 2011/0085447 A1* | 4/2011 | Kholaif | H04W 12/0433 370/242 |
| 2011/0107075 A1 | 5/2011 | Kwak | |
| 2011/0110282 A1 | 5/2011 | Wu et al. | |
| 2011/0194471 A1* | 8/2011 | Kim | H04W 52/0235 370/311 |
| 2011/0320824 A1* | 12/2011 | Isozaki | H04N 21/24 713/189 |
| 2012/0044900 A1* | 2/2012 | Morioka | H04B 7/0697 370/310 |
| 2012/0051365 A1 | 3/2012 | Bahr et al. | |
| 2012/0083293 A1* | 4/2012 | Bejerano | H04W 68/02 455/458 |
| 2012/0106449 A1 | 5/2012 | Shibuya | |
| 2012/0213219 A1* | 8/2012 | Shaffer | H04M 3/53341 370/352 |
| 2012/0250537 A1 | 10/2012 | Shatil et al. | |
| 2012/0278455 A1 | 11/2012 | Peng et al. | |
| 2013/0043976 A1 | 2/2013 | Creguer et al. | |
| 2013/0051293 A1 | 2/2013 | Wentink et al. | |
| 2013/0182843 A1* | 7/2013 | Buckley | H04L 9/083 380/255 |
| 2013/0242829 A1 | 9/2013 | Ge et al. | |
| 2014/0003310 A1* | 1/2014 | Kamath | H04W 52/00 370/311 |
| 2014/0056215 A1 | 2/2014 | Rajurkar et al. | |
| 2014/0064166 A1 | 3/2014 | Homchaudhuri et al. | |
| 2014/0112226 A1* | 4/2014 | Jafarian | H04W 52/0229 370/311 |
| 2014/0171056 A1 | 6/2014 | Jafarian et al. | |
| 2014/0219148 A1* | 8/2014 | Zhao | H04W 52/0229 370/311 |
| 2014/0274019 A1 | 9/2014 | Batchu et al. | |
| 2015/0143122 A1* | 5/2015 | Abraham | H04L 63/0876 713/170 |
| 2015/0350245 A1* | 12/2015 | Twitchell, Jr. | H04W 12/10 726/3 |
| 2015/0379274 A1 | 12/2015 | Nguyen-Huu | |
| 2016/0014773 A1 | 1/2016 | Seok et al. | |
| 2017/0238164 A1* | 8/2017 | Pang | H04W 12/06 455/41.3 |
| 2018/0063788 A1* | 3/2018 | Yang | H04W 12/108 |
| 2019/0045442 A1* | 2/2019 | Montoya | H04L 9/3213 |
| 2019/0364505 A1* | 11/2019 | Wang | H04W 52/0235 |
| 2020/0007373 A1* | 1/2020 | Lee | H04L 27/2603 |
| 2021/0258877 A1* | 8/2021 | Chitrakar | H04W 52/0216 |
| 2021/0360531 A1* | 11/2021 | Wang | H04W 52/0235 |
| 2022/0386237 A1* | 12/2022 | Won | H04W 52/0241 |

FOREIGN PATENT DOCUMENTS

| | | |
|---|---|---|
| CN | 104105089 A | 10/2014 |
| CN | 104469915 A | 3/2015 |
| EP | 2309805 A1 | 4/2011 |
| KR | 20160009531 A | 1/2016 |
| RU | 2570895 C2 | 12/2015 |
| WO | WO 2007106679 A2 | 9/2007 |
| WO | WO 2013032657 A1 | 3/2013 |
| WO | WO 2016160306 A1 | 10/2016 |

OTHER PUBLICATIONS

Telecommunications and information exchange between systems—Local and metropolitan area networks—Specific requirements, Part 11: Wireless LAN Medium Access Control (MAC) and Physical Layer (PHY) Specifications Amendment 5: Television White Spaces (TVWS) Operation, IEEE Standards Association; 802.11af-2013, Dec. 11, 2013, 198 pages.

Osama Aboul-Magd, IEEE 802.11 HEW SG Proposed CSD, Huawei Technologies; IEEE P802.11 Wireless LANs; doc: IEEE 802.11-14/0169r0 (available at https://mentor.ieee.org/802.11/dcn/14/11-14-0169-01-0hew-IEEE-802-11-hew-sg-proposed-cds.docx), Mar. 18, 2014, 6 pages.

Minyoung Park et al., LP-WUR (Low-Power Wake-Up Receiver): Enabling Low-Power and Low-Latency Capability for 802.11, Intel Corporation; IEEE 802.11-15/0027r0, Jan. 18, 2016, 21 pages.

Part 11: Wireless LAN Medium Access Control (MAC) and Physical Layer (PHY) Specifications, IEEE Standards Association; 802.11-2012, Mar. 29, 2012, 2793 pages.

(56) References Cited

OTHER PUBLICATIONS

Shahmaz Azizi et al., Wake-up Receiver Usage Scenarios and Applications, IEEE 802.11-16-0974r0; Intel Corporation, Jul. 25, 2016, 9 pages.
Part 11: Wireless LAN Medium Access Control (MAC) and Physical Layer (PHY) Specifications Amendment 3: Enhancements for Very High Throughput in the 60 GHz Band, IEEE Standards Association; 802.11ad-2012, Dec. 28, 2012, 628 pages.
Anonymous, "Part 11: Wireless LAN Medium Access Control (MAC) and Physical Layer (PHY) Specifications, Amendment 4: Enhancements for Very High Throughput for Operation in Bands below 6 GHz", IEEE Computer Society, IEEE Standards Association, Document IEEE Std 802.11ac-2013, Dec. 11, 2013, 425 pages.
Shahmaz Azizi et al., A PAR Proposal for Wake-up Radio, IEEE P802.11 Wireless LANs; doc. IEEE 802.11-16/1045r06, Jul. 28, 2016, 5 pages.

\* cited by examiner

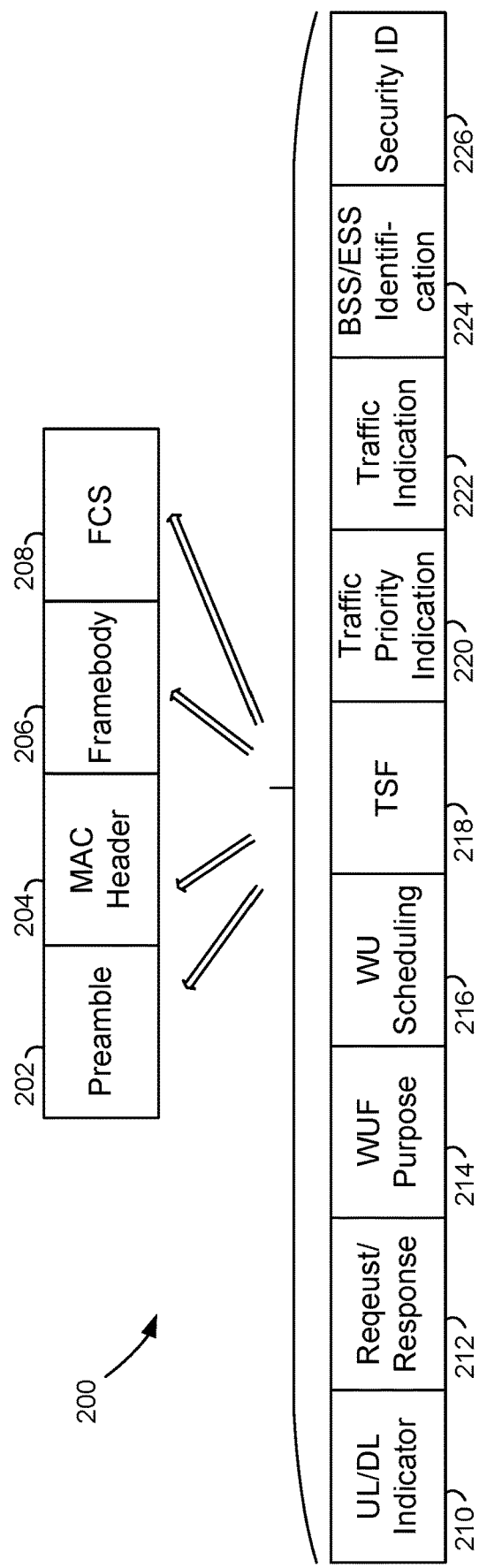
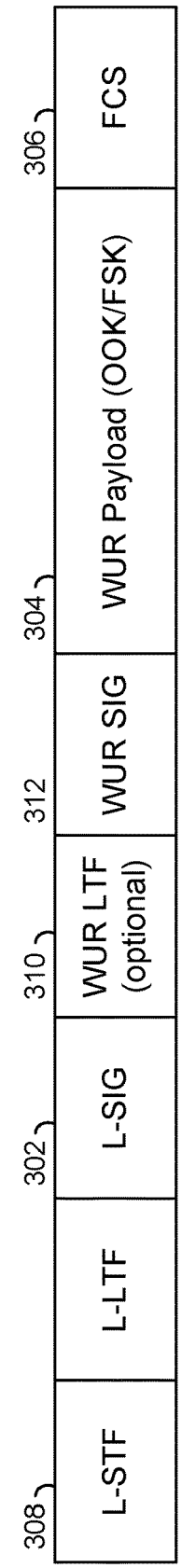
FIG. 2
FIG. 3

METHODS FOR EFFICIENT POWER SAVING FOR WAKE UP RADIOS

CROSS-REFERENCE TO RELATED APPLICATIONS

The present application is a continuation application of U.S. patent application Ser. No. 16/347,192 filed May 2, 2019, which is the National Stage Entry under 35 U.S.C. § 371 of Patent Cooperation Treaty (PCT) Application No. PCT/US2017/059893, filed Nov. 3, 2017, which is a non-provisional filing of, and claims benefit under 35 U.S.C. § 119 (e) from, U.S. Provisional Patent Application Ser. No. 62/417,134 entitled "METHODS FOR EFFICIENT POWER SAVING FOR WAKE UP RADIOS," filed Nov. 3, 2016, the entire contents of each of which is hereby incorporated by reference in its entirety, for all purposes.

BACKGROUND

Overview of WLAN Systems

A wireless local area network (WLAN) in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP, and/or STAs, communicating directly with each other. This mode of communication is referred to as an "ad-hoc" mode of communication.

Using the 802.11ac infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. Inverse fast Fourier Transform (IFFT) and time domain processing are done on each stream separately. The streams are then mapped on to the two channels, and the data is transmitted. At the receiver, this mechanism is reversed, and the combined data is sent to the MAC.

Sub 1 GHz modes of operation are supported by 802.11af, and 802.11ah. For these specifications, the channel operating bandwidths, and carriers, are reduced relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for machine-type communication (MTC) devices in a macro coverage area. MTC devices may have limited capabilities including only support for limited bandwidths, but also include a requirement for a very long battery life.

WLAN systems which support multiple channels, and channel widths, such as 802.11n, 802.11ac, 802.11af, and 802.11ah, include a channel which is designated as the primary channel. The primary channel may, but not necessarily, have a bandwidth equal to the largest common operating bandwidth supported by all STAs in the BSS. The bandwidth of the primary channel is therefore limited by the STA, of all STAs in operating in a BSS, which supports the smallest bandwidth operating mode. In the example of 802.11ah, the primary channel may be 1 MHz wide if there are STAs (e.g. MTC type devices) that only support a 1 MHz mode even if the AP, and other STAs in the BSS, may support a 2 MHz, 4 MHz, 8 MHz, 16 MHz, or other channel bandwidth operating modes. All carrier sensing, and NAV settings, depend on the status of the primary channel: if the primary channel is busy, for example, due to a STA supporting only a 1 MHz operating mode is transmitting to the AP, then the entire available frequency bands are considered busy even though majority of it stays idle and available.

In the United States, the available frequency bands which may be used by 802.11ah are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

High Efficiency WLAN Study Group and TGax

The IEEE 802.11™ High Efficiency WLAN (HEW) Study Group (SG) was created to explore the scope and purpose of a possible, future amendment to enhance the quality of service all users experience for a broad spectrum of wireless users in many usage scenarios including high-density scenarios in the 2.4 GHz and 5 GHz band. New use cases which support dense deployments of APs, and STAs, and associated Radio Resource Management (RRM) technologies are being considered by the HEW SG.

Potential applications for HEW include emerging usage scenarios such as data delivery for stadium events, high user density scenarios such as train stations, or enterprise/retail environments, and also evidence for an increased dependence on video delivery, and wireless services for medical applications.

The IEEE Standard board approved the IEEE 802.11ax Task Group (TG) based on a Project Authorization Request (PAR) and Criteria for Standards Development (CSD) developed in the HEW SG.

In TGax standard meetings, several contributions showed that the measured traffic for a variety of applications has a large likelihood for short packets, and there are network applications that may also generate short packets. The applications include the following:

Virtual office
TPC ACK
Video streaming ACK
Device/Controller (Mice, keyboards, Game controls, etc.)
Access—Probe request/response
Network selection—probe requests, ANQP
Network management—Control frames Also, many contributions in 802.11ax have proposed the introduction of MU features that include UL and DL OFDMA and UL and DL MU-MIMO. Designing and defining a mechanism for multiplexing UL random access for different purposes may be considered in the specification.
The Wake Up Receiver (WUR) Study Group In July 2016, the IEEE 802.11™ Wake Up Radio (WUR) Study Group (SG) was created to explore the scope and purpose of a future PHY and MAC amendment to provide enhanced low power operations of 802.11 devices. The MAC and PHY amendments may enable operations of a wake-up radio (WUR). A proposed Project Authorization Request (PAR) and Criteria for Standards Development (CSD) documents have been accepted by the WUR SG.

The expected operation bands of the WUR include 2.4 GHz, 5 GHz and may be extended to Sub 1 GHz. A WUR device operates as a companion radio to the primary connectivity radio, which is used to transmit regular 802.11 packets. WUR transmits packets that carry only control information and has active receiver power consumptions of less than one milliwatt. Receiving a wake-up packet by the WUR may cause the primary connectivity radio to wake up from sleep. The WUR is expect to have a range that is at least the same as the range of the primary connectivity radio operating on at least 20 MHz payload bandwidth.

Both AP and non-AP STAs may have WUR as a companion radio. Some usage cases for WUR include: IoT devices; low power operation for smart phones; quick message/incoming call notification scenario; quick status query/report, configuration change scenario; and quick emergency/critical event report scenario.

SUMMARY

Exemplary embodiments disclosed herein provide procedures for power efficient and rapid AP discovery using wake up radios. Additional embodiments provide procedures for securely waking up STAs using wake up radios. Methods are further described herein for coverage range detection and STA roaming for wake up radios. Further embodiments relate to procedures for coexistence for wake up radios and primary connectivity radios.

In some exemplary embodiments, a method is performed by an access point equipped with a wake-up radio (WUR) and a primary connectivity radio (PCR). In one such method, while the PCR is in a sleep state, the access point receives a wake-up frame on the WUR, wherein the wake-up frame includes an uplink/downlink indicator. In response to the wake-up frame, the access point wakes up the PCR only if the uplink/downlink indicator indicates an uplink transmission. In some such embodiments, the wake-up frame further includes an SSID/BSSID, and the waking up of the PCR is performed only if the SSID/BSSID in the wake-up frame is the SSID/BSSID of the access point. In some such embodiments, the access point is associated with a responding schedule, and the waking up of the PCR is performed only if the wake-up frame is received during a scheduled responding time for the access point in the responding schedule. In some such embodiments, the access point is associated with a responding schedule, and wherein the waking up of the PCR is performed only if (i) the wake-up frame is received during a scheduled responding time for the access point or (ii) an SSID/BSSID received in the wake-up frame is an SSID/BSSID of the access point.

In some embodiments, the wake-up frame includes a received access point configuration sequence number (CSN). In such embodiments, in response to the wake-up frame, the access point may send from the PCR an indication of whether the received CSN is the current CSN.

In some embodiments, in response to the wake-up frame, the access point sends a probe response frame from the PCR. In some embodiments, in response to the wake-up frame, the access point transmits a beacon from the PCR.

In some embodiments, before the PCR enters the sleep state, it transmits a security pass phrase. The access point determines whether a received pass phrase in the wake-up frame is the same as the transmitted security pass phrase, and the waking up of the PCR is performed only if the received pass phrase is the same as the transmitted security pass phrase.

In some embodiments, before the PCR enters the sleep state, it transmits a challenge phrase. The access point determines whether a response phrase in the wake-up frame corresponds to the transmitted challenge phrase, and the waking up of the PCR is performed only if the response phrase in the wake-up frame corresponds to the transmitted challenge phrase.

Additional embodiments include access points and other stations configured to perform the methods described herein.

BRIEF DESCRIPTION OF THE DRAWINGS

FIG. 2 illustrates an exemplary format of a wake up frame (WUF).

FIG. 3 illustrates an exemplary WUR packet structure in greater detail.

EXAMPLE NETWORKS FOR IMPLEMENTATION OF THE EMBODIMENTS

Figure 1A:
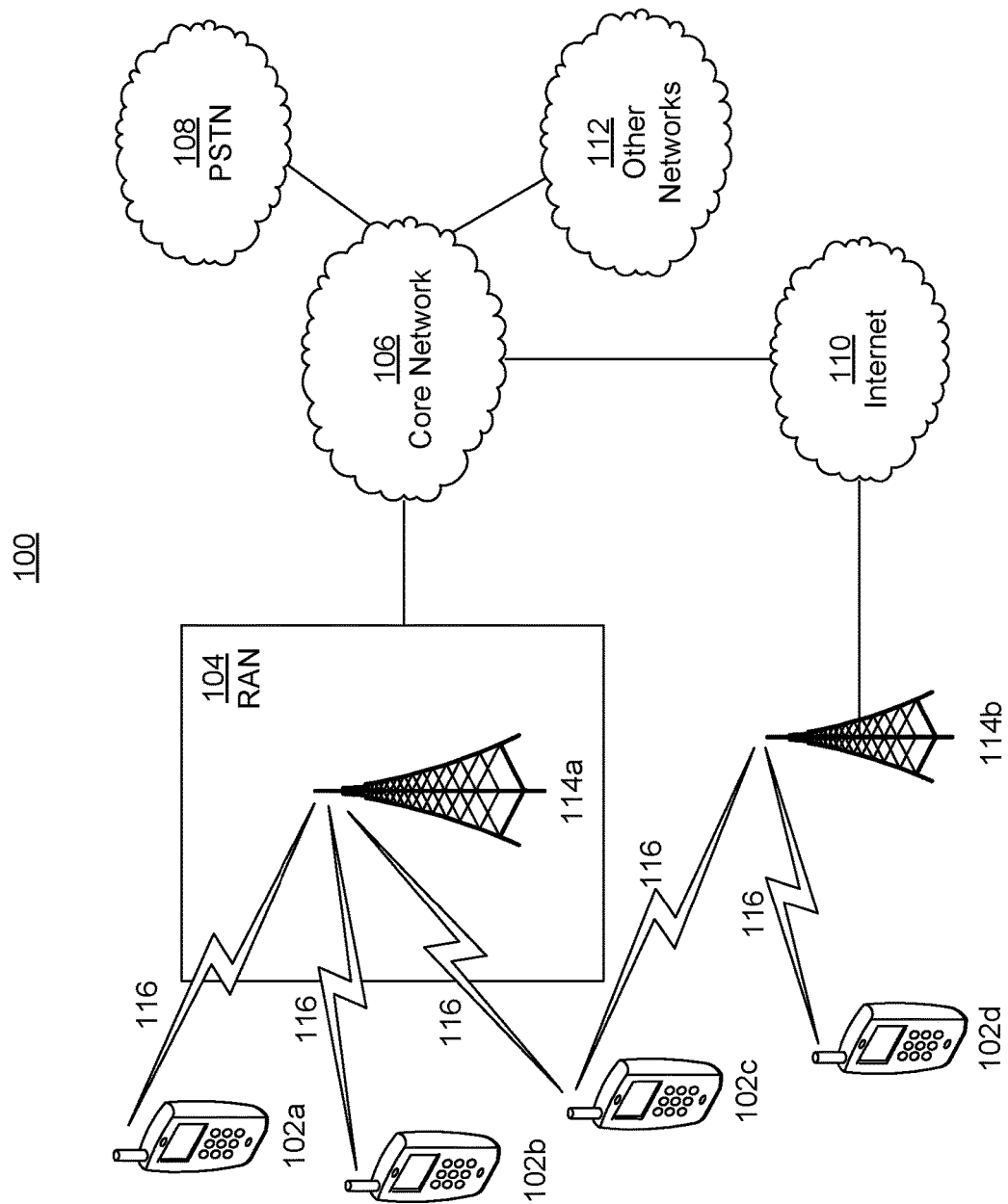
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
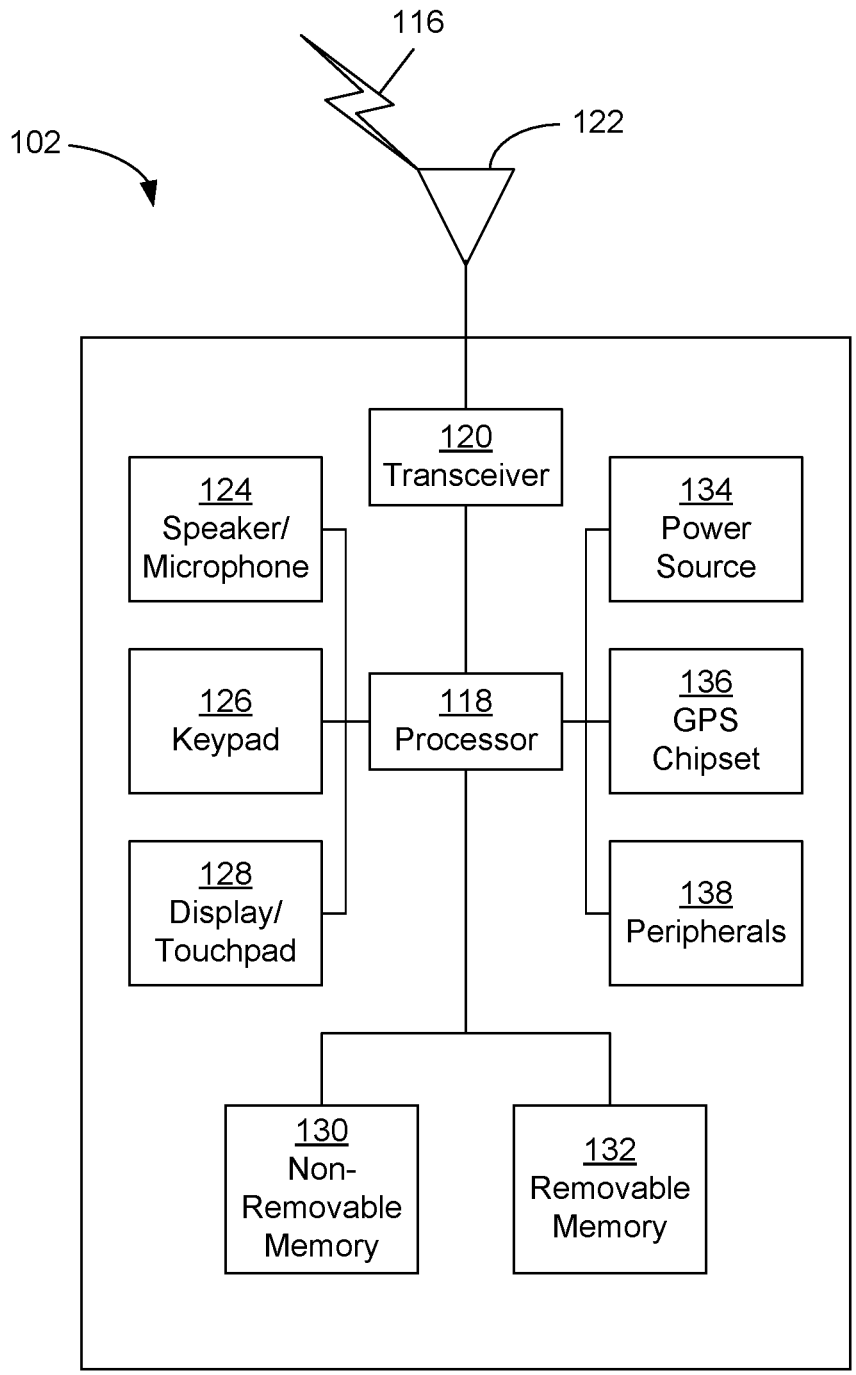
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
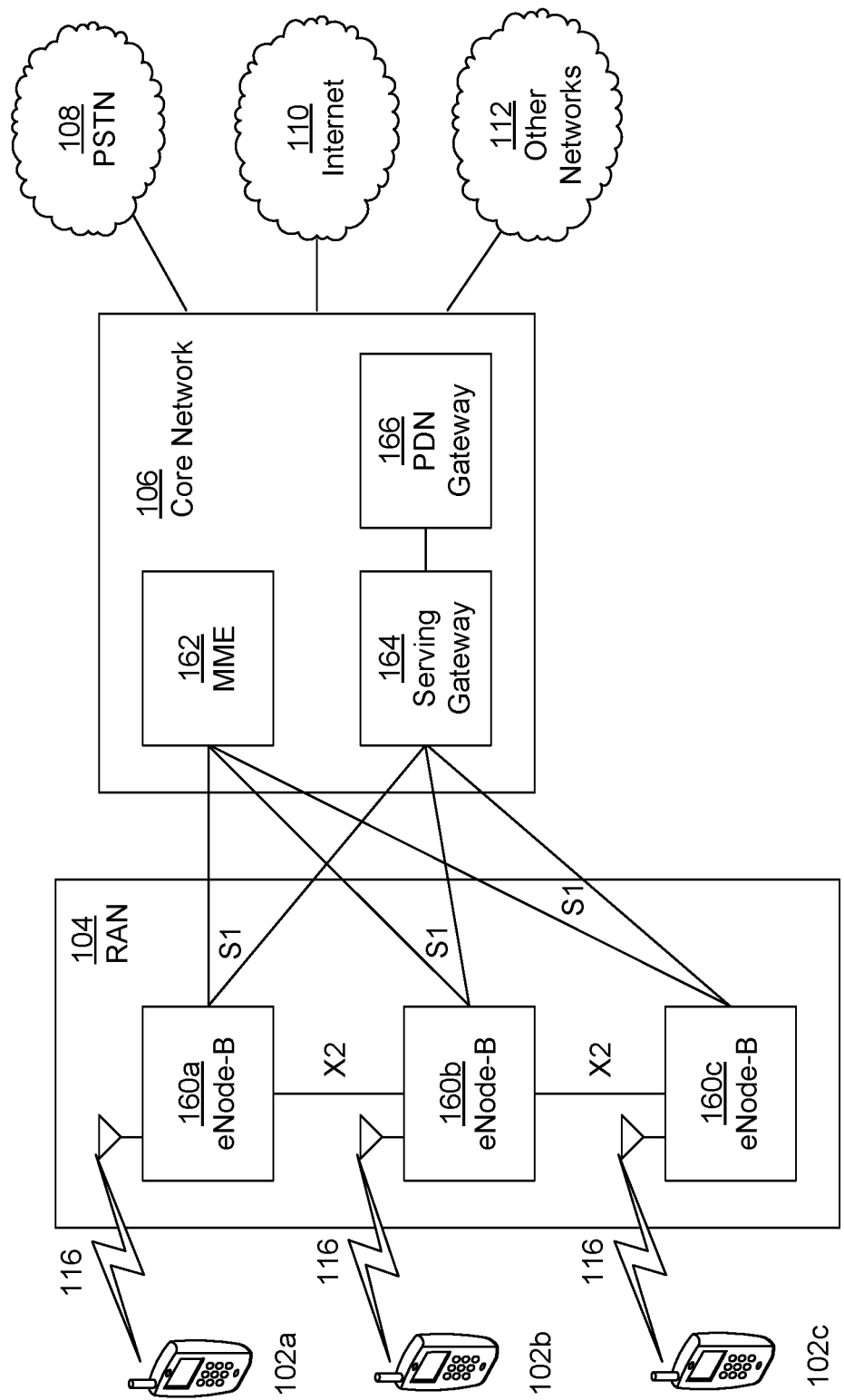
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
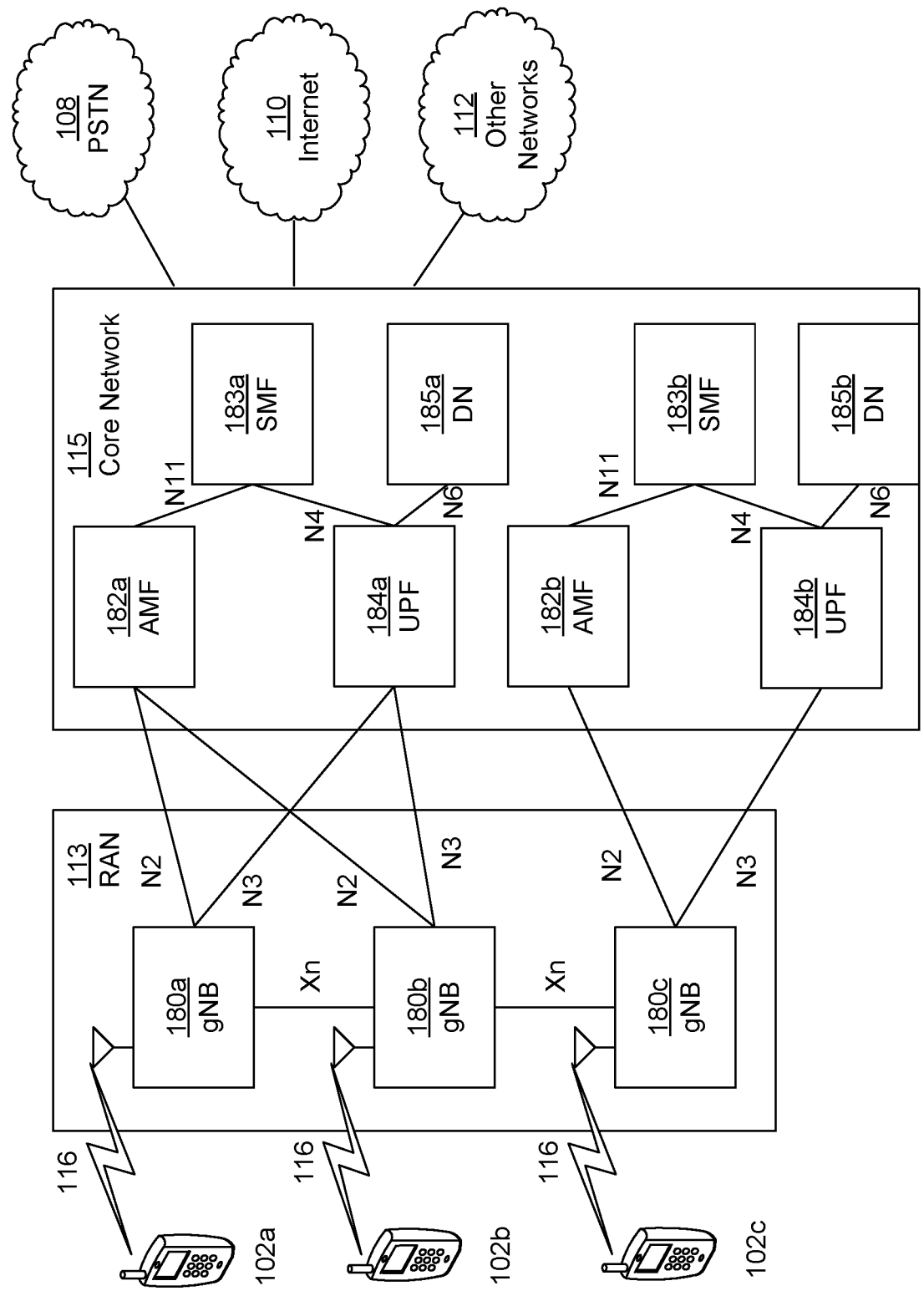
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

DETAILED DESCRIPTION

Issues Addressed in Exemplary Embodiments

Issues of Power Efficient and Rapid AP Discovery.

Exemplary embodiments disclosed herein address issues of power efficiency and rapid AP discovery. In various WUR scenarios, the primary connectivity radio associated with an AP may go into the sleep state for power saving. When a STA arrives in the coverage areas, it cannot detect any beacon if the AP is in sleep state. Even if a STA transmits a Probe Request, the AP will not respond with a Probe Response. This may result in significant delay before a STA can reestablish connections. On the other hand, if a STA wakes every AP within its range, while the STA only needs to associate with one of the APs, this will result in significant power waste. Embodiments disclosed herein address the issue of how to conduct rapid AP discovery in a power efficient manner for APs that are equipped with WUR and are in sleep state.

Issues of Secure Waking Up of STAs.

STAs and APs equipped with WURs typically operate using batteries and are intended to operate for an extended period of time. Malicious devices or parties may attempt to drain the batteries of the targeted APs or STAs by repeatedly waking them up until the devices and networks can no longer operate correctly. Embodiments disclosed herein address the issue of how to have STAs and APs set up secure waking up procedures and protocols to have their WUR recognize legitimate wake up packets from devices of interests and to wake up the primary connectivity radio when necessary.

Issues of Coverage Range Detection and Station Roaming.

When the primary radio is asleep, the STA may not hear a WUR packet addressed to itself for two reasons: (1) there is no DL traffic buffered at the AP for the STA, or (2) the STA is out of coverage of the AP. Exemplary embodiments operate to distinguish these two cases, as in the second case, the STA should perform scanning on primary radio for a new BSS association, or perform handover to a non-802.11 technology.

Issues of Extended Interframe Space (EIFS) Deferral.

When a STA operates on the primary radio, the WUR may be turned off. In this case if the WUR packet/signal is sent on the same channel as the channel the primary radio operates on, and the primary radio cannot decode the waveform of WUR, it may cause the third party STAs to perform EIFS deferral. This overhead may be similar to the time used by WUR packet/signal. While not significant, it does give non-802.11 technologies operating on the same channel extra advantages. Previously, this issue affected only older versions of STAs; however, for the case of WUR, all STAs participating in data transfer may be affected if the primary radio could not decode the WUR waveform.

Embodiments Relating to Power Efficient and Rapid AP Discovery

Wake Up Frame Format.

In exemplary embodiments, the Wake up frame (WUF) 200 used by the Wake Up Radios (WUR) may have the following format as depicted by FIG. 2. The Wake Up frame may include one or more of the following parts: Preamble 202, MAC Header 204, Framebody 206, frame check sequence (FCS) 208. The Wake Up frame may consist of additional fields such as Packet Extension, (PE), control trailers, etc. The preamble may include Wake Up Radio preamble as well as legacy 802.11 preamble.

The Wake Up frame may contain one or more of the following fields in one or more of its parts: an UL/DL Indicator field 210, a Request/Response field 212, a Wake Up Frame (WUF) Purpose field 214, a Wake Up Scheduling field 216, a TSF (Timing Synchronization Function) timer field 218, a Traffic Priority Indication field 220, a Traffic Indication field 222, a BSS/SS/ESS Identification field 224, and/or a Security ID field 226.

UL/DL Indicator. An UL/DL Indicator field 210 may indicate whether the Wake Up frame is sent in the Uplink direction (from STA to AP) or in the Downlink direction (from AP to STA) or in a peer to peer fashion (from a non-AP STA to another non-AP STA) or in an AP to AP fashion (from an AP to another AP). In one example, UL/DL Indicator may use one bit with one value indicating the WUF is sent in the Uplink direction, and the other value indicating the WUF is sent in the Downlink direction. In another example, two bits may be used, using the value "00" to indicate peer to peer WUF transmissions, "01" to indicate Downlink transmission of WUF, "10" to indicate Uplink WUF transmissions, and using "11" to indicate AP to AP WUF transmissions. The UL/DL Indicator may be included in the preamble or MAC header, or any other part of the WUF, such as Packet Extension and Control Trailers. The UL/DL Indictor may also be implemented using scrambler seeds, phase rotations between symbols, etc.

Request/Response.

A Request/Response field 212 identifies whether the Wake Up Frame is a Wake up request frame or response frame. In another implementation, the Request/Response frame may be identified using one or more bits in the Preamble or MAC header or any other part of the frame, for example, in the Type/Subtype field in the MAC header.

WUF Purpose.

A Wake Up Frame (WUF) Purpose field 214 may contain information indicating one or more of the purposes why the WUF is sent to wake up the primary connectivity radio associated with the STA that is targeted. For example, this field may contain one or more of the following values: (Re)Association, Authentication, Disassociation, (DL/U L) data transmission, Status Inquiry, Emergency Reporting, General, Max Idle Period Reached, TDLS Establishment, TDLS Establishment, Route Discovery, Listen To Beacon, Listen to TIM, Timing Synchronization Function (TSF) Timer Update, and the like.

WU Scheduling.

A Wake Up Scheduling field 216 may contain the scheduling and configuration for the primary connectivity radio of the targeted STAs after they are awake. This field may indicate whether the primary connectivity radio of the targeted STA should transmit or receive. For example, the WU Scheduling field may contain a duration after which the targeted STA should wake up their primary connectivity radio and start to transmit or receive. The duration may be referenced to a TSF Timer value (which may be included in the WUF or stored from a previous transmission), or to the end of the current WUF.

TSF Timer.

A TSF (Timing Synchronization Function) timer field 218 may contain information reflecting the TSF Timer value. For example, the entire TSF Timer value either at the AP or at the STA may be indicated. In another example, the partial TSF Timer, e.g., 4 or 2 or 1 least significant bytes of the TSF Timer may be included. In yet another example, a compressed version of the TSF Timer is included.

Traffic Priority Indication.

A Traffic Priority Indication field 220 may be used to indicate the traffic that is buffered for the targeted STAs. For example, the priorities and/or access categories for any or the highest priority buffered traffic may be included. Some values for this field may include, Status Polling, Emergency Reporting, UL/DL Data Requested, UL/DL Data Reported, Max Idle Period Exceeded, Request for Beacon. Additionally, or alternatively, traffic priority for buffered traffic intended for the targeted STA may be included such as VI, VO, BK, BE. In another example, a hash of a selection of traffic priority may be included.

Traffic Indication.

A Traffic Indication field 222 may be used to indicate the size or the amount of buffered traffic intended for the targeted STA. This field may contain indication whether there is traffic buffered for the targeted STA. Additionally or alternatively, the size of buffered traffic may be included, for example, the number of packets, the size of each or all packets, the estimated time needed to transmit one or more or all buffered traffic.

BSS/SS/ESS Identification.

A BSS/SS/ESS Identification field 224 may be used to identify one or more BSS or ESS for which the WUF is intended. For example, one or more IDs of BSS or SS, or ESS may be included in this field, such BSSID, ESSID, SSID, BSS Color. In another example, a hash of one or more IDs of BSS, SS or ESS or other identifiers may be included.

Security ID.

A Security ID field 226 may be used to indicate security related information. For example, this field may contain one or more secure passwords or phrases that both the transmitting and targeted STAs agreed upon before one or both them went into the sleep state. In another example, this field may contain the answer to a challenge phrase that was sent by the targeted STA. The challenge phrase may be contained in an earlier WUF or in a frame that was sent by the primary connectivity radio (PCR) of the targeted STA before one or both of them went into the sleep state. In one example, the challenge phrase may be sent in a response frame to a STA if a Sleep Notification frame has been received from that STA. In another example, a secure password or phrase may be sent in response to a STA if a Sleep Notification frame has been received from that STA. In yet another example, a secure password or phrase may be sent by a STA in a frame that notifies another STA that it is going into the sleep state and will turn off its PCR.

WUR AP Discovery with Targeted Networks.

In some embodiments, an exemplary procedure for WUR AP discovery with targeted networks may be as follows.

A STA that is equipped with WUR may have entered a new area or has recently lost its connection to a network (such as stepping off a train or plane), or a STA's WUR has transmitted one or more wake up frames to a STA and has not received a valid response within a certain duration time may initiate a WUR AP discovery process. A WUR STA may initiate the WUR AP discovery process if it has received one or more WUR beacons transmitted by APs that are equipped with WUR.

The WUR AP Discovery process may take place concurrently or before or after the regular AP discovery process using the PCR. If a desirable AP has been discovered by the regular AP discovery process using the PCR, then the WUR AP discovery process is stopped immediately in some embodiments. This may be achieved by using a MLME or SME procedure or primitive to instruct the WUR to stop the WUR AP discovery process. In another example, the STA may turn off its WUR when the PCR is in use, and/or has discovered or is associated with an AP.

A STA equipped with WUR may send a WUF with one or more of the following settings and parameters:

- The STA may set the UL/DL Indictor in the WUF to indicate Uplink direction of WUF transmission.
- The STA may set in the WUF that the WUF is a WU Request frame.
- The WUF may include a broadcast or multicast address in its preamble and/or MAC header. If the WUF is targeted at a particular BSS and/or AP, then the BSSID, BSS Color or the identifier of the WUR of the AP of the desired BSS may be included in the preamble and/or MAC header of the WUF.
- The WUF may indicate in the WUF that the purpose of the WUF is to discovery AP for association and/or reassociation
- The WUF may include one or more identifiers of one or more BSS, SS and/or ESS, such as BSSID, SSID and ESSID, HESSID, BSS Color. The WUF may include a hash of one or more identifiers of one or more BSS, SS and/or ESS, such as BSSID, SSID, ESSID, HESSID, BSS Color.
- The WUF may contain information identifying the power level at which the WUF is transmitted.

When a WUR associated with a non-AP STA receives a WUF, and the WUR detects that the WUF has a UL/DL Indicator indicating either Uplink, and/or AP to AP, the WUR may ignore the WUF. Otherwise, the WUR may continue decoding the WUF if it also detects the WUF is meant for itself, for example, by detecting its WUR address in the preamble and/or MAC header, or by detecting a broadcast and/or multicast address in the preamble and/or MAC header in a case where the WUF is sent by the AP of the WUR or by a non-AP STA with which the receiving STA has established a peer to peer, e.g., DLS or TDLS, relationships.

When a WUR associated with an AP receives a WUF, and it detects that the WUF has a UL/DL Indicator indicating either Downlink, and/or Peer to Peer, it may ignore the WUF. When a WUR associated with an AP receives a WUF with a UL/DL Indicator containing the indication of Uplink direction or AP to AP, it may continue to decode the WUF. It may continue to decode the WUF if it detects the WUF contains its ID, such as MAC address, BSSID, in the preamble and/or MAC header.

In some such embodiments, when a WUR associated with an AP receives a WUF, has determined that the WUF is meant for itself (e.g., contains the BSSID of the AP), and has detected that the WUF is sent by a STA that is requesting association and/or reassociation, the WUR may ignore the WUF if the WUF is received below a certain SINR (signal-to-interference-plus-noise ratio) threshold. If the WUF contains information identifying the transmit power level, the receiving WUR may use the transmit power and receive power to evaluate pathloss and may ignore the WUF if the pathloss exceeds a threshold. Additionally, or alternatively, the WUR may evaluate whether the WUF contains sufficient information, such as security information. Alternatively, the requesting STA may include a power threshold in its WUF which may indicate that it is requesting responses from APs which have received the WUF with at least the indicated power levels. If the WUR determines that sufficient information has been provided, it may send a WUR ACK (which may contain Response Indication and/or Downlink direction indication) which may also contain a WU scheduling of the AP's PCR. Alternatively, the WU scheduling may instruct the requesting STA at which time it may start transmit using its PCR to conduct the association/reassociation process. Alternatively, the WUR associated with the AP may also instruct in a WUR Response frame for the requesting STA to monitor a future beacon or short beacon that is scheduled to be transmitted by the AP's PCR. If the WUR associated with the AP calls for additional information, such as security information, it may indicate the request for additional information in a WUR response frame.

If a WUR associated with an AP receives a broadcast or multi-cast WUF containing the indication that the WUF is sent to request waking up the AP for association or reassociation, the WUR may further evaluate whether the WUF contains a list of BSS, SS or ESS and whether the BSS to which the AP belongs is part of the desired BSS, SS or ESS included in the WUF. If the broadcast/multicast WUF does not contain a list or a hash of identifiers of BSS, SS or ESS, the WUR may choose to ignore the WUF.

If the WUF does contain a list or hash of identifiers of BSS, SS, or ESS, and if the BSS, SS and/or ESS to which the AP belongs is contained in the list, the WUR associated with the AP may conduct the following actions. The WUR may ignore the WUF if the WUF is received below a certain SINR threshold. If the WUF contains the transmit power level, the receiving WUR may use the transmit power and receive power to evaluate pathloss and may ignore the WUF is the pathloss exceeds a threshold. If the WUF contains a power threshold, a STA that has received the WUF below the threshold may ignore the WUF. Additionally or alternatively, the WUR may evaluate whether the WUF contains sufficient information, such as security information. If the WUR considers sufficient information has been provided, the WUR may send a WUR ACK (which may contain Response Indication and Downlink direction indication) which may also contain a WU scheduling of the AP's PCR. Alternatively, the WU scheduling may convey to the requesting STA information regarding the time at which the STA may start transmit using its PCR to conduct the association/reassociation process. Alternatively, the WUR associated with the AP may also, in a WUR Response frame, instruct the requesting STA to monitor for a future beacon or short beacon that is scheduled to be transmitted by the AP's PCR. If the WUR associated with the AP needs additional information, such as security information, the WUR may indicate the request for additional information in a WUR response frame.

AP Discovery with Pre-Acquired Information.

In certain scenarios, a STA may have acquired information of APs, BSSs, SSs and ESSs prior to coming into an area before the AP discovery process. For example, a STA may have acquired from its cellular provider information on the provider's hotspot and may have already established security credentials with one or more BSSs. In another example, a STA may come to the same location every day and may have had established association with an AP previously and may have had established information and security credentials. These kinds of pre-acquired information may be leveraged when discovering APs and services.

An exemplary procedure for AP discovery with pre-acquired information may be as follows:

A STA that is equipped with a WUR may have entered an area and may initiate a WUR AP discovery process. It may have acquired information regarding existing APs and networks in the area through other connections, previous encounters, GPS/location coordinates, databases, or other means. If a WUR STA has acquired its desired APs' sleeping scheduling, (e.g., verified that the hotspot AP is currently sleeping through a cellular provider connection), it may initiate WUR AP discovery immediately.

A WUR STA may initiate the WUR AP discovery process if it has received one or more WUR beacons transmitted by APs that are equipped with a WUR.

If a STA has already established credentials with an AP, it may include its own identifier and the established credentials in the WUF targeted at the APs with which it has already established credentials.

When a WUR associated with an AP receives a WUF which carries established credentials, which may be used for association/reassociation purposes, the WUR may check the identifiers and established credentials that it has received, e.g., through a backbone network or other interface. If the STA identifiers and credentials are verified, the WUR responds with a WUR Response frame (which may contain Response Indication and/or Downlink direction indication) which may also contain a WU scheduling of the AP's PCR. Alternatively, the WU scheduling may instruct the requesting STA at which time it may start transmit using its PCR to conduct the association/reassociation process. Alternatively, the WUR associated with the AP may also, in a WUR Response frame, instruct the requesting STA to monitor for a future beacon or short beacon that is scheduled to be transmitted by the AP's PCR. If the WUR associated with the AP needs additional information, such as security information, it may request additional information in a WUR response frame.

In another implementation, when the WUR associated with an AP receives a WUF which carries established credentials, which may be used for association/reassociation purpose, it may first send a WUR frame, such as WUR ACK (which may contain Downlink indication and/or Response Indication). It may also provide the requesting STA a response schedule in the responding WUR frame, at which time the requesting STA should expect another WUR response frame after the WUR associated an AP has verified the indicated credentials.

A STA may include in the WUF, which may be used to request the AP to power on PCR for the purpose of association/reassociation, a AP-CSN (AP Configuration Sequence Number), and/or a Common Advertisement Group (CAG) Number, that may be obtained either during previous association and/or through other means. When the WUR associated with the AP receives a WUF targeted at itself and contains an AP-CSN and/or CAG Number, it may compare these numbers with the current versions of AP-CSN and CAG Number stored at the AP. If the received AP-CSN and CAG Number are current, the AP may indicate that the AP-CSN and CAG Numbers are current in a response frame, for example, a WUR Response frame. The requesting STA may be able to proceed with authentication and association directly without sending Probe Request using its main PCR once the PCR of the AP is turned on.

Scheduled Responding AP.

When there are multiple APs from the same SS or ESS located within the same area, not all of them need to wake up to conduct association with any newly arrived STAs. Neighboring APs from the same SS or ESS may exchange packets negotiating a responding AP schedule. Such a schedule may be established using the Target Wake Time (TWT) mechanism.

If the SS/ESS responding schedule indicates that an AP does not need to be the responding AP for the SS/ESS, the AP may perform one or more of the following. (1) The AP may ignore any WUFs that contains identifiers for the SS or ESS; may only respond to WUFs that are targeted at its own BSS, for example, WUFs that contains the BSSID or BSS Color in its preamble and/or MAC header. (2) The AP may also ignore broadcast/multi-cast WUFs that is not specifically addressed to the BSS to which it belongs. (3) The AP may adjust its sensitivity levels of the WUR to only receive WUFs from its coverage areas.

If the responding AP schedule indicates that one of the APs from a SS or ESS should be responding, the AP may perform one or more of the following. (1) the AP may adjust its sensitivity level of the WUR to receive WUFs from a larger area than its direct BSS coverage area. (2) The AP may respond to all legitimate WUFs targeted at the SS and/or ESS, which may include the identifiers of the SS and/or ESS. (3) The AP may respond to all legitimate broadcast/multi-cast WUFs. (4) When responding to the legitimate WUFs that are either broadcast/multicast or targeted at the SS and/or ESS to which the AP belongs, the AP may provide a list of one or more APs that belong to the same SS and/or ESS, which may be more appropriate for the requesting STA to associate with. For example, the list of one or more APs may contain the location of the APs. The requesting STA may select the most appropriate AP based on its own locations, and send WUFs to that BSS of the most appropriate AP. The AP may then wake up to conduct association/reassociation process with the requesting AP using its PCR.

Exemplary Method

Figure 7:
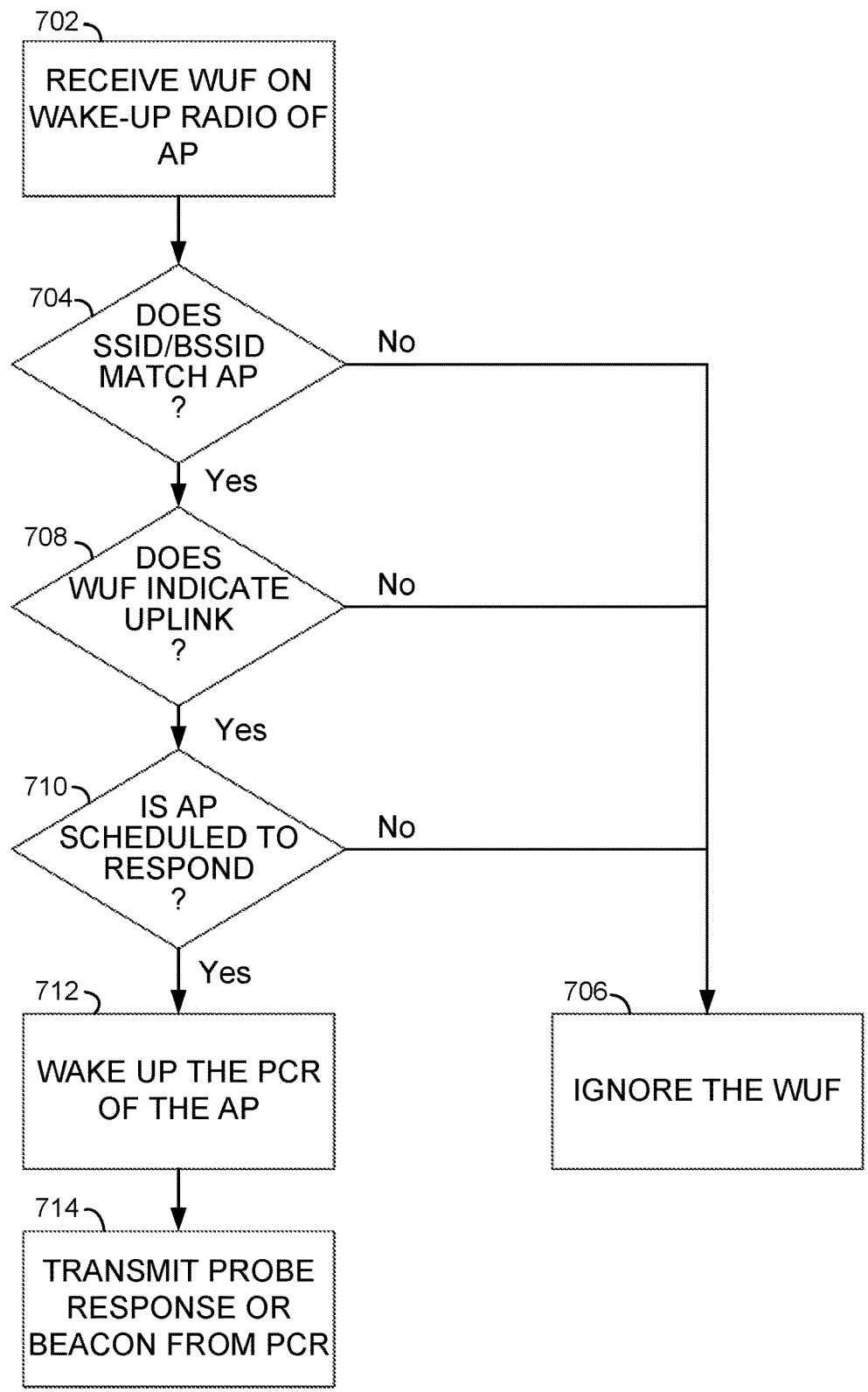
FIG. 7 is a flow chart illustrating an exemplary method of processing a wake up frame in some embodiments.

One exemplary method for operating an access point equipped with a wake up radio is illustrated in FIG. 7. In step 702, a wake up frame is received on the wake up radio of the access point. Various conditions are tested to determine whether or not to wake up the primary connectivity radio of the access point in response to the wake up frame. For example, in step 704, a determination is made of whether an SSID/BSSID or other identifier conveyed in the wake up frame matches the identifier of the access point. If not, the access point may ignore the wake up frame and not wake up the primary connectivity radio of the access point in response to the wake up frame. In step 708, a determination is made of whether an UL/DL Indicator field in the wake up frame indicates an uplink transmission, then a determination may be made (subject in some cases to additional conditions) to wake up the primary connectivity radio; otherwise, the wake up frame may be ignored. In step 710, a determination may be made of whether the access point is scheduled to respond (e.g. according to a schedule agreed to among access points). If not, then the wake up frame may be ignored. If all appropriate conditions are met, the primary connectivity radio may be woken up (step 712). In response to the wake up frame, the primary connectivity radio may transmit a probe response or beacon as appropriate (step 714).

Embodiments Relating to Secure Waking Up of STAs

Security Setup.

In exemplary embodiments, STAs and APs may establish credentials prior to one of them going to sleep.

In some exemplary embodiments, a security setup procedure and the WUR mode switching procedure for a non-AP STA may operate as follows.

A non-AP STA, e.g., STA1, may have determined that it has no more data to transmit to the AP or that it has received all downlink data from the AP or from a peer to peer STA, and the STA may thus make a determination to go into the sleep state by turning off its PCR.

Prior to turning off its PCR, the non-AP STA may send a frame to its associated AP with an indication that the STA will go into the WUR mode by turning off its PCR. An existing frame may be used for this purpose. Alternatively, a new WUR Notification frame may be used. In one embodiment, the Power Management bit may be reused to indicate WUR mode switching when the non-AP STA and the associated AP have both indicated support for WUR operations in the association process, such as in the Probe Request/Response frames, and in Association Request/Response frames. In another embodiment, a new WUR mode switching indicator may be included in the WUR Notification frame. In another embodiment, the transmission of the WUR Notification frame may indicate that the transmitting STA is switching to WUR mode by turning off its PCR.

The STA may include a Time field in the WUR Notification frame to indicate that it is turning off its PCR at the time indicated in the Time field.

If the WUR Notification frame is encrypted, the STA may include a pass phrase which the receiving STA, such as an AP or a peer to peer STA (e.g., a STA that has established a DLS or TDLS connections with transmitting STA) needs to include in any WUF that it sends to wake up STA1 when in WUR mode. In another implementation, the receiving STA of the WUR Notification frame may include in the WUR Notification Response frame a pass phrase assigned to the transmitting STA. The AP or peer to peer STA may use the assigned pass phrase in any future WUF targeted at STA1. In another implementation, the AP or peer to peer STA may assign one or more pass phrases to STA1 included in the WUR Notification response frame, e.g., one pass phrase for unicast WUF, one pass phrase for multicast WUF, one pass phrase for broadcast WUF, or one pass phrase for multicast/broadcast WUF. A multicast pass phrase may be associated with the group that STA1 belongs to, which may be MU-MIMO group, OFDMA MU Group, TWT group, RAW Group or any other kind of group. In one example, the pass phrases may be assigned during the association process and/or at a later time after the association or establishment of peer to peer connections. In another implementation, STA1 may include a challenge phrase in its WUR Notification frame, if STA1 and the receiving STA have agreed on the security algorithm used, and the receiving STA may use the response phrase to the challenge phrase in any future WUFs trying to wake up STA1.

A responding STA, such as an AP or peer to peer STA, that is responding to a WUR Notification frame may include a deferral request in the WUR Notification frame requesting that STA1 postpone switching to WUR mode.

A responding STA, such as an AP or peer to peer STA, may include in the WUR Notification response frame a WUR scheduling for themselves, as well as pass phrase(s) that STA1 should use in its WUFs to wake up the responding STA.

STA1 may switch to the WUR mode and turn off its PCR after receiving an acknowledgement and/or response to its WUR Notification frame.

A STA, such as the associated AP or a peer to peer STA, may try to wake up STA1 by sending a WUF (with Request indication and Downlink direction indication in case of the AP, or Peer to Peer indication in case of a peer to peer STA). The WUF may contain the ID of the transmitting STA, such as an association identifier (AID) or compressed AID, the type of the WUF, such as unicast WUF, multicast WUF, broadcast WUF, as well as a pass phrase, which may be provided by STA1, or assigned to STA1, or the response phrase to the challenge phrase sent by STA1.

The WUR associated with STA1 may evaluate the received the WUF, and may ignore the WUF if any one or more of the parameters, transmitting STA ID, the type of the WUF and the pass phrase, do not match with the appropriate parameters or combination of parameters that it has on record. The WUR associated with STA1 may respond to the WUF, e.g., by transmitting a WUF response frame, or turn on its PCR, when any one or more of the parameters, transmitting STA ID, the type of the WUF and the pass phrase, match with the appropriate parameters or combination of parameters that STA1 has on record.

In some embodiments, a security set up procedure and WUR switching procedure for an AP may operate as follows.

An AP, such as AP1, may provide one or more pass phrases to a STA during the association process, and/or at any later time after the association. For a non-AP STA, such as STA1, that is associated with the AP, the pass phrase it uses to wake up the AP may be the pass phrase assigned to it by the AP. In another example, the pass phrase to wake up the AP may be based on one or more of STA1's AID, and/or BSSID of the AP, STA1's MAC address, and the like.

An AP may provide its WUR schedules in its (short) beacons, or any other type of frames.

An AP may provide a WUR sleep schedule for itself and/or a pass phrase in a WUR Notification Response frame when receiving a WUR Notification frame from a STA that is associated with itself.

AP1 may switch to WUR mode at a scheduled time, which may be immediately proceeded by a (short) beacon which announces that the AP is switching to WUR mode by turning off its PCR.

A non-AP STA, for example STA1, which is associated with AP1, may try to wake up the AP by sending a unicast WUF (with WU Request indication and/or Uplink direction indication) which may contain the identifier of the transmitting STA, and/or a pass phrase. The pass phrase may be assigned by the AP or may be derived based on one or more of the following parameters: STA's AID or other IDs, such as MAC address, TSF Timer, BSSID, etc.

The WUR associated with AP1 may ignore a received WUF if one or more of the parameters such as STA's MAC address, AID, pass phrases do not match one or more or combinations of the STA's AID or other IDs, such as MAC address, TSF Timer, BSSID, etc., that it has on record. The AP may respond to a received WUF, e.g., by sending a WU Response frame, or turning on its PCR, if one or more of the parameters such as STA's ID, MAC address, AID, pass phrases match one or more or combinations of the parameters such as STA's AID or other IDs, MAC address, TSF Timer, BSSID, etc., that it has on record.

AP Procedure when Receiving Broadcast and Multi-Cast Wake-Up Frame.

An AP may receive many WUFs when it is in the WUR mode with its PCR turned off. Since a WUR AP may be constraint in energy resources, it may be cautious not to respond to malicious WUFs that intend to wake up the AP often to drain its battery in order to disable the functionalities of the networks.

In an exemplary embodiment, an AP in WUR mode may conduct the following actions when receiving a broadcast and/or multicast WUF or a unicast WUF from a STA that is not associated with that AP.

If the AP is part of a set of APs for the same SS and/or ESS in an area that has established a responding AP schedule, the AP may follow the procedures detailed in the above section entitled "Scheduled Responding AP."

If the AP recognizes that the WUF is from a STA that has established credentials or has pre-acquired information, the AP may follow the procedures detailed in the above section entitled "AP Discovery with Pre-Acquired Information."

In some embodiments, an AP may use a probabilistic method to determine whether to respond to a WUF. For example, the AP may select a number P between 0 and 1, and when a WUF is received that was broadcast/multicast or unicast from a STA that is not associated with it, the AP randomly generates a number, if the number is smaller than (or equal to) P, then it will respond to the WUF by either sending a WU Response frame, or a turning on its PCR. Other probabilistic methods may alternatively be used.

If an AP has discovered that there are many false WUFs, the AP may adjust the number P to a lower value for a certain duration. In some embodiments, there may be a minimum value Pmin such that the value P remains greater than or equal to Pmin.

If an AP has lower energy reserve (e.g. below a threshold level), the AP may also adjust the number P to a lower value. In some embodiments, there may be a minimum value Pmin such that the value P remains greater than or equal to Pmin.

Frame Structure for WUR Security.

In some embodiments, exemplary frame structures are proposed to enable either PHY or MAC layer security for a WUR. These frame structures may be used in conjunction with the security procedures discussed in the above sections entitled "Wake up frame format," "WUR AP Discovery with Targeted networks," and "AP Discovery with Pre-Acquired Information."

An exemplary WUR packet structure is illustrated in FIG. 3. The WUR packet 300 may include a legacy 802.11 preamble followed by a payload 304. The preamble may include a legacy SIGNAL field L-SIG 302. The legacy 802.11 preamble may not be decoded by the WUR receiving the packet. The payload may include a wakeup preamble, a MAC header (address of the receiver), a frame body, and a frame check sequence (FCS) 306. This structure may use on-off keying (OOK) or frequency-shift keying (FSK) on the orthogonal frequency-division multiplexing (OFDM) tones to transmit the payload. The WUR may synchronize to the packet with the legacy STF (short training field) 308 and identify the packet as a WUR packet with the optional WUR LTF (long training field) 310.

In some embodiments, the WUR LTF is used to identify the packet as a WUR packet with details such as the user address (among other details) placed in the WUR SIG (signal) field 312.

In an exemplary embodiment, to enable PHY layer security, one or more of the following methods may be performed.

Figure 4:
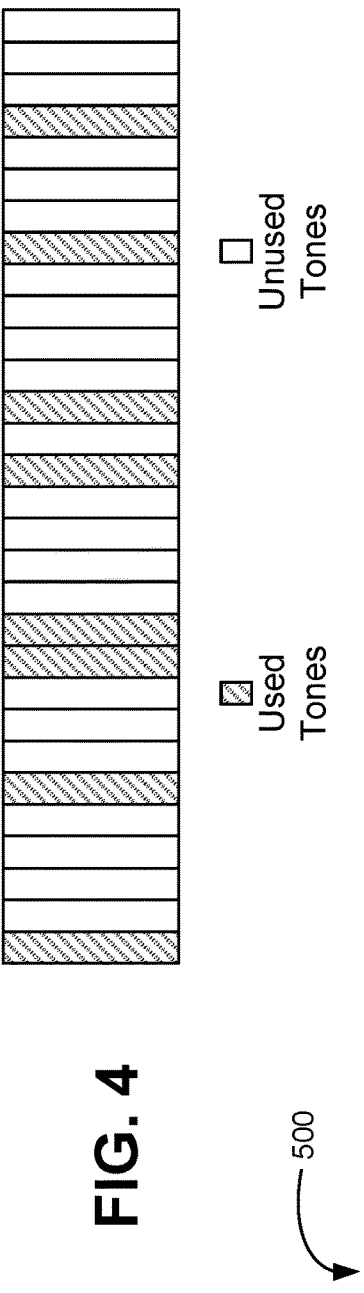
FIG. 4 illustrates exemplary PHY Layer OFDM signaling for WUR Security.

In some embodiments, tones that are transmitted on with valid data in the payload field by OOK or FSK modulation may be user specific and based on an agreed-upon security code or pass. As illustrated in FIG. 4, user-specific tones (illustrated with diagonal hatching) may be selected based on the security code. To prevent identification of the used tones by energy, random data may be placed on other tones. For further security, the transmitter and WUR may agree on the total number of tones to be excited allowing for different WUR receivers to have a different number of tones excited. Pre-FEC (forward error correction) padding may be used to ensure that the information transmitted covers all the tones. This may prevent a malicious user from performing an exhaustive search for a fixed number of tones.

The FCS (frame check sequence) may be calculated based on the interaction of the transmitted data with a security code or pass.

Figure 5:
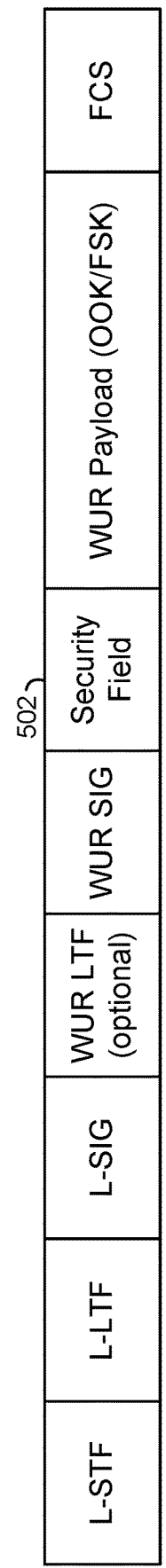
FIG. 5 illustrates an exemplary detailed WUR packet structure with a security field.

In one method, a security field 502 that transmits information to enable the proper decoding of the payload and/or estimation of the FCS may be placed in the frame structure 500 as shown in FIG. 5.

Figure 6:
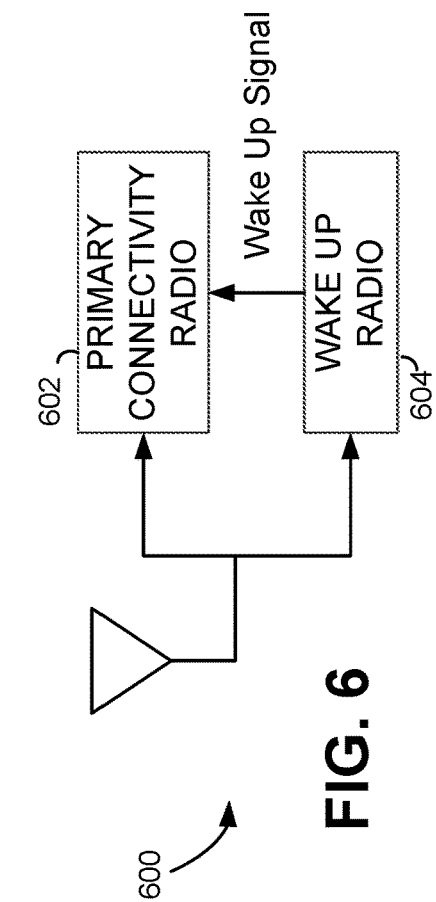
FIG. 6 is a schematic block diagram illustrating an access point equipped with a wake-up radio.

An exemplary access point (AP) 600 is illustrated in FIG. 6. The access point 600 includes a primary connectivity radio 602 operative to send and receive data to communicate with other devices. The primary connectivity radio 602 is operative to enter a sleep state to conserve energy when data communications are not required. The access point 600 further includes a wake up radio 604 that detects incoming wake up frames and determines, using techniques described herein, whether to send a wake up signal to the primary connectivity radio 602 in response to a wake up frame. To wake up the primary connectivity radio 602, the wake up radio 604 is operative to send a wake up signal to the primary connectivity radio 602.

Embodiments Relating to Coverage Range Detection and Station Roaming

WUR Packet/Signal from AP with a Minimum Frequency.

Before an STA operates on the WUR only (for example, when its PCR is turned off), the associated AP and the STA may have an agreement that a WUR packet/signal is sent from the AP with at least a certain frequency.

STA-Requested Periodic WUR Packet/Signal.

In some embodiments, before operating on WUR only, the STA may request that the AP send a WUR packet/signal with a certain frequency, if it has detected from its main radio or from WUR that the AP signal is less than a power or SNR threshold. Alternatively, the STA may request the periodic packet/signal independent of the observed AP signal strength.

In some embodiments, the periodicity of the WUR packet/signal requested by the STA may be based on STA's traffic characteristics.

In some embodiments, the AP may respond to the STA with a revised periodicity after receiving STA's request.

AP-Determined Periodicity.

In some embodiments, the minimum frequency for the WUR packet/signal transmitted by the AP (for out-of-coverage detection) may be determined by the AP without the STA's input. The AP may announce the periodicity in beacon/probe response/(Re-)association response frames.

AP may broadcast in the WUR waveform a beacon frame periodically which contains part or all the information of the beacon transmitted by the primary radio.

WUR Packet/Signal Used for Out-of-Coverage Detection.

In some embodiments, the WUR packet sent by AP used by a STA for out-of-coverage detection may not need to be addressed to the STA. Any WUR packet/signal from the associated AP may be used for the detection purpose.

The WUR packet/signal identifies the AP with a certain accuracy. For example, BSSID or "color" of the BSS could be explicitly encoded in the packet, or implicitly embedded in the WUR packet/signal, e.g. scrambling the WUR PSDU CRC by the color.

The WUR packet for out-of-coverage detection may be a null data packet with no MAC data. The information needed may be placed in the PHY header for simplicity and to reduce the need for the WUR to decode an entire packet.

The WUR packet may also be piggy-backed on any transmission by the transmitter that is within x-seconds of the interval required by the WUR.

Embodiments Relating to Extended Interframe Space (EIFS) Deferral: Minimize/Avoid EIFS Deferral for Third Party STA Operating Using Primary Connectivity Radio Only Aggregation of Multiple WUR Frames after an 11a/g Preamble.

In some embodiments, the overhead of the EIFS may be reduced by aggregating multiple WUR frames to different STAs as one PHY frame as seen by the primary radio or third party legacy STAs. If n WUR frames are aggregated, there will be only one EIFS invoked by third party STAs instead of n EIFSs.

Because multiple STAs receive WUR frames at the same time with this aggregation, when accessing using primary radio to reply to WUR frame, different STAs may apply a different IFS/deferral before the normal EDCA procedure to access the channel.

Sending WUR Frame without 11 a/g Preamble.

In some embodiments, a WUR frame is sent without any legacy 802.11 preamble, such that 802.11 primary radio only defers to WUR frame based on Energy Detection. Because there is no preamble recognizable to the primary radio, there is no attempt to decode the frame and no EIFS is invoked after the WUR frame. One potential disadvantage of this approach is that STA may transmit on top of WUR frames because of a more relaxed CCA based on ED.

Use Non-Critical Portion of a Frame to Embed a WUR Packet/Signal.

In some embodiments, the WUR signal may be embedded in part of legacy frames that is not used by legacy STAs. For example, PE of 11ax frame may be used to carry WUR signals and this will not cause other 11 ax STA to perform EIFS deferral. In some embodiments, this is used for the WUR frame/signal of out-of-range detection. In some embodiments, the WUR signal identifying BSS piggy backs on 11ax DL frames instead of a separate packet.

Mandating Timing of Primary Radio Ack to the WUR Packet.

In some embodiments, a specification may mandate the STA should respond to WUR frame on the primary radio with a certain IFS duration. Because the responding frame is understood by third party STAs' primary radio, there would be no EIFS deferral.

Notes on Embodiments

Although the features and elements of the present invention are described in the preferred embodiments in particular combinations, each feature or element can be used alone without the other features and elements of the preferred embodiments or in various combinations with or without other features and elements of the present invention.

Although the solutions described herein consider 802.11 specific protocols, it is understood that the solutions described herein are not restricted to this scenario and are applicable to other wireless systems as well.

Although SIFS is used to indicate various inter frame spacing in the examples of the designs and procedures, all other inter frame spacing such as RIFS or other agreed time interval could be applied in the same solutions.

In exemplary embodiments, a method is provided for transmitting a wake up frame (WUF), wherein the wake up frame comprises a preamble, a MAC header, and a frame check sequence. In such a method, the wake up frame may further comprises at least one field selected from the group consisting of: an uplink/downlink indicator; a request/response indicator; a WUF purpose field; a wake up scheduling field; a Timing Synchronization Function (TSF) field; a traffic priority indication; a traffic indication; a BSS/SS/ESS Identification; and a Security ID.

In further exemplary embodiments, a wake up radio (WUR) access point (AP) discovery method is provided. In one such method, a wake up frame (WUF) is sent, wherein the WUF comprises at least one indication selected from the group consisting of: an uplink/downlink indicator; an indication that the WUF is a WU Request frame; a broadcast address; a multicast address; an indication that that the purpose of the WUF is AP discovery; a BSS identifier; an SS identifier; an ESS identifier; and a power level at which the WUF is transmitted. In some such embodiments, the discovery method is performed in response to transmitting at least one WUF to a STA and failing to receive a valid response to the transmitted WUF. In some such embodiments, the WUR AP discovery method is stopped in response to discovery of an AP through a primary connectivity radio (PCR) discovery process.

In further exemplary embodiments, a method is provided for receiving a WUF at a WUR associated with a non-AP STA and decoding the WUF only if (i) the WUF has a UL/DL Indicator indicating either Uplink or AP-to-AP, and (ii) the WUR determines that it is an addressee of the WUF. In some such embodiments, the WUR determines whether it is an addressee of the WUF by detecting its WUR address in the preamble and/or MAC header. In some embodiments, the WUR determines whether it is an addressee of the WUF by detecting a broadcast and/or multicast address in the preamble and/or MAC header and the WUF is sent by an its AP or by a non-AP STA with which the receiving STA has established a peer to peer relationship.

In further exemplary embodiments, a method is provided for receiving a WUF at a WUR associated with an AP and continuing to decode the WUF in response to a determination that the WUF includes an UL/DL Indicator containing the indication of Uplink direction or AP to AP.

In further exemplary embodiments, a method includes receiving a WUF at a WUR associated with an AP and continuing to decode the WUF in response to a determination that the WUF contains an ID of the WUR. In some such embodiments, the ID may be an ID selected from the group consisting of a MAC address, BSSID, in the preamble and MAC header.

In an exemplary embodiment, a method is provided for receiving a broadcast or multi-cast WUF at a WUR associated with an AP, wherein the WUF contains the indication that it is sent to request waking up the AP for association or reassociation. The method further includes evaluating whether the WUF contains a list of BSS, SS or ESS and whether the BSS to which the AP belongs is part of the desired BSS, SS or ESS included in the WUF. In some such embodiments, additional actions are performed in response to a determination that the WUF contains a list or hash of identifiers of BSS, SS, or ESS, and the BSS, SS and/or ESS to which the AP belongs is contained in the list. The additional actions include one or more of the following actions: ignoring the WUF if the WUF is received below a certain SINR threshold; if the WUF contains the transmit power level, using the transmit power and receive power to evaluate pathloss and ignoring the WUF if the pathloss exceeds a threshold; instructing the requesting STA at which time it may start transmit using its PCR to conduct the association/reassociation process; and instructing in a WUR Response frame for the requesting STA to monitor a future beacon or short beacon that is scheduled to be transmitted by the AP's PCR.

In a further exemplary embodiment, a method includes receiving at a WUR associated with an AP a WUF that carries established credentials; checking the identifiers and established credentials that it has received; and responding with a WUR Response frame in response to verification of the identifiers and established credentials.

In a further exemplary embodiment, a method is performed by a plurality of APs from the same SS or ESS located within the same area. In the method, packets are exchanged among the plurality of APs to negotiate a responding AP schedule for responding to WUFs.

A further exemplary method is performed by a non-AP STA, which sends a frame to an AP associated with the STA indicating that the STA will go into the WUR mode by turning off its PCR. The frame may include a pass phrase for waking up the STA.

In some exemplary embodiments, a method includes, before a STA operates on the WUR, only establishing an agreement between the STA and an associated AP and that a WUR packet/signal is sent from the AP with at least a certain periodicity. The periodicity may be determined at least in part based on a signal strength. The periodicity may be determined at least in part based on a traffic characteristic. The periodicity may be determined by the AP.

Exemplary embodiments further include AP STAs and non-AP STAs that are configured to perform any of the methods described herein.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a station (STA), the method comprising:
receiving a wake-up frame, wherein the wake-up frame indicates at least a first security phrase derived from timing information associated with a timing synchronization function (TSF) timer, and wherein the first security phrase is determined based on a frame check sequence (FCS) field of the wake-up frame;
determining a second security phrase based on the received wake-up frame; and
waking up the STA based on a determination that there is a match between the second security phrase and the first security phrase indicated in the wake-up frame.

2. The method of claim 1, further comprising:
before the STA enters a sleep mode, transmitting a challenge phrase, wherein the waking up of the STA is performed only if a response phrase indicated in the wake-up frame corresponds to the transmitted challenge phrase.

3. The method of claim 1, wherein the wake-up frame includes an SSID/BSSID, and wherein the waking up of the STA is performed only if the SSID/BSSID in the wake-up frame is an SSID/BSSID associated with the STA or an access point.

4. The method of claim 1, wherein the STA is a non-access-point STA, wherein the wake-up frame includes an uplink/downlink indicator, and wherein the waking up of the STA is performed only if the uplink/downlink indicator indicates a downlink transmission.

5. The method of claim 1, wherein the STA is an access point associated with a responding schedule, and wherein the waking up of the STA is performed only if the wake-up frame is received during a scheduled responding time for the access point in the responding schedule.

6. The method of claim 1, wherein the STA is an access point associated with a responding schedule, and wherein the waking up of the STA is performed only if (i) the wake-up frame is received during a scheduled responding time for the access point or (ii) an SSID/BSSID received in the wake-up frame is an SSID/BSSID of the access point.

7. The method of claim 1, wherein the STA is an access point and the wake-up frame includes a received access point configuration sequence number (CSN), the method further comprising, in response to the received wake-up frame, sending from the STA an indication of whether the received CSN is a current CSN.

8. The method of claim 1, further comprising, in response to the received wake-up frame, transmitting a beacon from the STA.

9. The method of claim 1, wherein the timing information is associated with a timing synchronization function (TSF) timer.

10. The method of claim 1, further comprising:
transmitting a first frame indicating that the STA will enter a wake-up radio (WUR) mode; and
receiving a second frame indicating an acknowledgement of the first frame being received.

11. A station (STA) for wireless communications, the STA being configured to perform functions comprising:
receiving a wake-up frame, wherein the wake-up frame indicates at least a first security phrase derived from timing information associated with a timing synchronization function (TSF) timer, and wherein the first security phrase is determined based on a frame check sequence (FCS) field of the wake-up frame;
determining a second security phrase based on the received wake-up frame; and
waking up the STA based on a determination that there is a match between the second security phrase and the first security phrase indicated in the wake-up frame.

12. The STA of claim 11, wherein the STA is further configured to perform functions comprising:
before the STA enters a sleep mode, transmitting a challenge phrase, wherein the waking up of the STA is performed only if a response phrase indicated in the wake-up frame corresponds to the transmitted challenge phrase.

13. The STA of claim 11, wherein the wake-up frame includes an SSID/BSSID, and wherein the waking up of the STA is performed only if the SSID/BSSID in the wake-up frame is an SSID/BSSID associated with the STA or an access point.

14. The STA of claim 11, wherein the STA is a non-access-point STA, wherein the wake-up frame includes an uplink/downlink indicator, and wherein the waking up of the STA is performed only if the uplink/downlink indicator indicates a downlink transmission.

15. The STA of claim 11, wherein the STA is an access point associated with a responding schedule, and wherein the waking up of the STA is performed only if the wake-up frame is received during a scheduled responding time for the access point in the responding schedule.

16. The STA of claim 11, wherein the STA is an access point associated with a responding schedule, and wherein the waking up of the STA is performed only if (i) the wake-up frame is received during a scheduled responding time for the access point or (ii) an SSID/BSSID received in the wake-up frame is an SSID/BSSID of the access point.

17. The STA of claim 11, wherein the STA is an access point and the wake-up frame includes a received access point configuration sequence number (CSN), wherein the STA is further configured to perform functions comprising, in response to the received wake-up frame, sending from the STA an indication of whether the received CSN is a current CSN.

18. The STA of claim 11, wherein the STA is further configured to perform functions comprising, in response to the received wake-up frame, transmitting a beacon from the STA.

19. The STA of claim 11, wherein the timing information is associated with a timing synchronization function (TSF) timer.

20. The STA of claim 11, wherein the STA is further configured to perform functions comprising:
- transmitting a first frame indicating that the STA will enter a wake-up radio (WUR) mode; and
- receiving a second frame indicating an acknowledgement of the first frame being received.

* * * * *